C. Lockwood,

Screen.

No. 104,173.   Patented June 14, 1870.

Witnesses:
A. W. Almqvist
Alex. F. Roberts

Inventor:
Chas. Lockwood
Per Munn & Co
Attorneys.

United States Patent Office.

CHARLES LOCKWOOD, OF HAVERSTRAW, NEW YORK.

Letters Patent No. 104,173, dated June 14, 1870.

IMPROVEMENT IN SCREENS.

The Schedule referred to in these Letters Patent and making part of the same

To all whom it may concern:

Be it known that I, CHARLES LOCKWOOD, of Haverstraw, in the county of Rockland and State of New York, have invented a new and useful Improvement in Screens, Gratings, &c.; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to improve the construction of the metallic part of the screen or grating, and the manner of attachment to the frame to adapt it for use for sand and coal screens, ash-sieves, door and window-gratings, wool-washing machine, gratings, and similar purposes; and It consists in the construction and combination of various parts of the machine, as hereinafter more fully described.

A represents the frame, which may be the frame of a screen, door, window, or other thing, to which the grating or screen is to be applied.

B represents the wires or rods of the screen or grating, the size and distance apart of which depend upon the particular use to which the screen or grating is to be applied.

Figure 2:
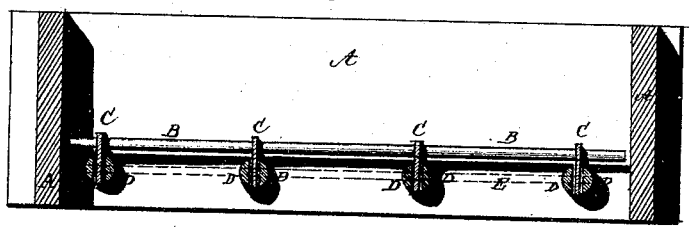
Figure 2 is a longitudinal section of the same, taken through the line $y\ y$, fig. 3.
Figure 3:
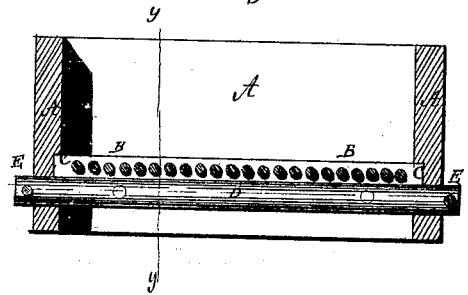
Figure 3 is a cross-section of the same, taken through the line $x\ x$ of fig. 1.

The wires or rods B are passed through holes formed in the upper parts of the bar C, as shown in figs. 2 and 3.

The bars C are made with shoulders or tenons upon their ends, which are passed through holes at the proper distance apart in the side bars of the frame A.

D are half round bars, placed upon the opposite sides of the bars C, and riveted to them, as shown in fig. 3.

Figure 1:
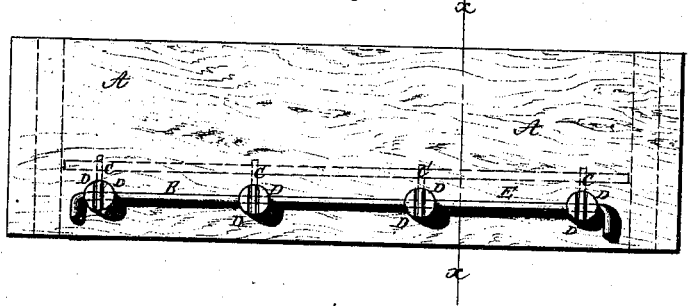
Figure 1 is a side view of the frame, showing the manner in which the screen or grating is secured in place.

The bars D are made equal in length with the bars C, and their ends pass through the holes in side bars of the frame A, as shown in figs. 1 and 3.

The bars D are intended to give the requisite strength and stiffness to the bars C, while allowing the said bars C to be made so light that they may be readily punched.

The bars C D are secured in place in the frame A by the wires or rods E, which pass continuously through all the ends of the said bars C D, upon each side of the frame A, as shown in fig. 1.

The wires or rods E are secured in place by bending their ends down upon the sides of the end bars C D, as shown in fig. 1.

This construction makes the screen or grating strong and stiff, enables it to be readily and cheaply made, and adapts it for use as a screen or grating, as may be desired.

Having thus described my invention,

I claim as new and desire to secure by Letters Patent—

1. The combination of two half round bars D, with each of the cross-bars C, through holes in which the wires or rods B pass, substantially as herein shown and described, and for the purposes set forth.

2. The combination of the continuous wires or rods E with the ends of the half round bars D, perforated bars C, and frame A, substantially as herein shown and described, and for the purpose set forth.

The above specification of my invention signed by me this 24th day of November, 1869.

CHARLES LOCKWOOD.

Witnesses:
GEO. W. MABEE,
JAMES T. GRAHAM.